United States Patent
Baliarda et al.

(10) Patent No.: US 7,932,870 B2
(45) Date of Patent: *Apr. 26, 2011

(54) INTERLACED MULTIBAND ANTENNA ARRAYS

(75) Inventors: Carles Puente Baliarda, Sant Cugat del Valles (ES); Jordi Romeu Robert, Sant Cugat del Vallés (ES); Sebastian Blanch Boris, Barcelona (ES)

(73) Assignee: Fractus, S.A., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,308

(22) Filed: Jun. 2, 2009

(65) Prior Publication Data
US 2009/0267863 A1 Oct. 29, 2009

Related U.S. Application Data

(63) Continuation of application No. 11/803,782, filed on May 16, 2007, now Pat. No. 7,557,768, which is a continuation of application No. 10/988,261, filed on Nov. 12, 2004, now Pat. No. 7,250,918, which is a continuation of application No. 10/135,019, filed on Apr. 23, 2002, now Pat. No. 6,937,191, which is a continuation of application No. PCT/ES99/00343, filed on Oct. 26, 1999.

(51) Int. Cl.
*H01Q 21/08* (2006.01)
*H01Q 5/01* (2006.01)

(52) U.S. Cl. .................................... 343/844; 343/853
(58) Field of Classification Search ........... 343/700 MS, 343/844, 853, 893
See application file for complete search history.

(56) References Cited

U.S. PATENT DOCUMENTS

| | | | |
|---|---|---|---|
| 3,521,284 | A | 7/1970 | Shelton et al. |
| 3,599,214 | A | 8/1971 | Altmayer |
| 3,622,890 | A | 11/1971 | Fujimoto et al. |
| 3,683,376 | A | 8/1972 | Pronovost |
| 3,818,490 | A | 6/1974 | Leahy |
| 3,967,276 | A | 6/1976 | Goubau |
| 3,969,730 | A | 7/1976 | Fuchser |
| 4,024,542 | A | 5/1977 | Ikawa et al. |
| 4,131,893 | A | 12/1978 | Munson et al. |

(Continued)

FOREIGN PATENT DOCUMENTS
DE 3337941 5/1985
(Continued)

OTHER PUBLICATIONS

Sanad, Mohamed, "A Compact Dual-Broadband Microstrip Antenna Having Both Stacked and Planar Parasitic Elements", IEEE Antennas and Propagation Society International Symposium 1996 Digest, Jul. 21-26, 1996, pp. 6-9.

(Continued)

*Primary Examiner* — Michael C Wimer
(74) *Attorney, Agent, or Firm* — Winstead PC

(57) ABSTRACT

Antenna arrays which can work simultaneously in various frequency bands thanks to the physical disposition of the elements which constitute them, and also the multiband behavior of some elements situated strategically in the array. The configuration of the array is described based on the juxtaposition or interleaving of various conventional monoband arrays working in the different bands of interest. In those positions in which elements of different multiband arrays come together, a multiband antenna is employed which covers the different working frequency bands. The advantages with respect to the classic configuration of using one array for each frequency band are: saving in cost of the global radiating system and its installation (one array replaces several), and its size and visual and environmental impact are reduced in the case of base stations and repeater stations for communication systems.

38 Claims, 12 Drawing Sheets

U.S. PATENT DOCUMENTS

| | | |
|---|---|---|
| 4,141,016 A | 2/1979 | Nelson |
| 4,243,990 A | 1/1981 | Nemit et al. |
| 4,471,358 A | 9/1984 | Glasser |
| 4,471,493 A | 9/1984 | Schober |
| 4,504,834 A | 3/1985 | Garay et al. |
| 4,543,581 A | 9/1985 | Nemet et al. |
| 4,571,595 A | 2/1986 | Phillips et al. |
| 4,584,709 A | 4/1986 | Kneisel et al. |
| 4,590,614 A | 5/1986 | Erat et al. |
| 4,623,894 A | 11/1986 | Lee et al. |
| 4,673,948 A | 6/1987 | Kuo |
| 4,730,195 A | 3/1988 | Phillips et al. |
| 4,839,660 A | 6/1989 | Hadzoglou |
| 4,843,468 A | 6/1989 | Drewery et al. |
| 4,847,629 A | 7/1989 | Shimazaki et al. |
| 4,849,766 A | 7/1989 | Inaba et al. |
| 4,857,939 A | 8/1989 | Shimazaki et al. |
| 4,890,114 A | 12/1989 | Egashira et al. |
| 4,894,663 A | 1/1990 | Urbish et al. |
| 4,907,011 A | 3/1990 | Kuo |
| 4,912,481 A | 3/1990 | Mace et al. |
| 4,975,711 A | 12/1990 | Lee et al. |
| 5,030,963 A | 7/1991 | Tadama et al. |
| 5,138,328 A | 8/1992 | Zibrik et al. |
| 5,168,472 A | 12/1992 | Lockwood |
| 5,172,084 A | 12/1992 | Fiedziuszko et al. |
| 5,200,756 A | 4/1993 | Feller et al. |
| 5,214,434 A | 5/1993 | Hsu et al. |
| 5,218,370 A | 6/1993 | Blaese |
| 5,227,804 A | 7/1993 | Oda et al. |
| 5,227,808 A | 7/1993 | Davis |
| 5,245,350 A | 9/1993 | Sroka et al. |
| 5,248,988 A | 9/1993 | Makino et al. |
| 5,255,002 A | 10/1993 | Day et al. |
| 5,257,032 A | 10/1993 | Diamond et al. |
| 5,262,791 A | 11/1993 | Tsuda et al. |
| 5,307,075 A | 4/1994 | Huynh |
| 5,347,291 A | 9/1994 | Moore |
| 5,355,144 A | 10/1994 | Walton et al. |
| 5,355,318 A | 10/1994 | Dionnet et al. |
| 5,373,300 A | 12/1994 | Jenness et al. |
| 5,402,134 A | 3/1995 | Miller et al. |
| 5,420,599 A | 5/1995 | Erkocevic et al. |
| 5,422,651 A | 6/1995 | Chang et al. |
| 5,451,965 A | 9/1995 | Matsumoto et al. |
| 5,451,968 A | 9/1995 | Emery |
| 5,453,751 A | 9/1995 | Tsukamoto |
| 5,457,469 A | 10/1995 | Diamond et al. |
| 5,471,224 A | 11/1995 | Barkeshli |
| 5,493,702 A | 2/1996 | Crowley et al. |
| 5,495,261 A | 2/1996 | Baker et al. |
| 5,497,164 A | 3/1996 | Croq et al. |
| 5,534,877 A | 7/1996 | Sorbello |
| 5,537,367 A | 7/1996 | Lockwood et al. |
| H1631 H | 2/1997 | Montgomery et al. |
| 5,619,205 A | 4/1997 | Johnson |
| 5,684,672 A | 11/1997 | Karidis et al. |
| 5,712,640 A | 1/1998 | Andou et al. |
| 5,767,811 A | 6/1998 | Mandai et al. |
| 5,798,688 A | 8/1998 | Schofield |
| 5,821,907 A | 10/1998 | Zhu et al. |
| 5,838,282 A * | 11/1998 | Lalezari et al. ............... 343/727 |
| 5,841,403 A | 11/1998 | West |
| 5,870,066 A | 2/1999 | Asakura et al. |
| 5,872,546 A | 2/1999 | Ihara et al. |
| 5,898,404 A | 4/1999 | Jou et al. |
| 5,903,240 A | 5/1999 | Kawahata et al. |
| 5,926,141 A | 7/1999 | Lindenmeier et al. |
| 5,943,020 A | 8/1999 | Liebendoerfer et al. |
| 5,966,098 A | 10/1999 | Qi et al. |
| 5,969,689 A | 10/1999 | Martek et al. |
| 5,973,651 A | 10/1999 | Suesada et al. |
| 5,986,610 A | 11/1999 | Miron |
| 5,990,838 A | 11/1999 | Burns et al. |
| 6,002,367 A | 12/1999 | Engblom et al. |
| 6,025,812 A | 2/2000 | Gabriel et al. |
| 6,028,568 A | 2/2000 | Asakura et al. |
| 6,031,499 A | 2/2000 | Dichter |
| 6,031,505 A | 2/2000 | Qi et al. |
| 6,054,953 A | 4/2000 | Lindmark et al. |
| 6,078,294 A | 6/2000 | Mitarai et al. |
| 6,091,365 A | 7/2000 | Derneryd et al. |
| 6,097,345 A | 8/2000 | Walton |
| 6,104,349 A | 8/2000 | Cohen |
| 6,127,977 A | 10/2000 | Cohen |
| 6,131,042 A | 10/2000 | Lee et al. |
| 6,133,882 A | 10/2000 | LaFleur et al. |
| 6,140,969 A | 10/2000 | Lindenmeier et al. |
| 6,140,975 A | 10/2000 | Cohen |
| 6,154,180 A | 11/2000 | Padrick |
| 6,160,513 A | 12/2000 | Davidson et al. |
| 6,172,618 B1 | 1/2001 | Hakozaki et al. |
| 6,175,333 B1 | 1/2001 | Smith et al. |
| 6,211,824 B1 | 4/2001 | Holden et al. |
| 6,211,841 B1 | 4/2001 | Smith et al. |
| 6,218,992 B1 | 4/2001 | Sadler et al. |
| 6,236,372 B1 | 5/2001 | Lindenmeier et al. |
| 6,266,023 B1 | 7/2001 | Nagy et al. |
| 6,281,846 B1 | 8/2001 | Puente Baliarda et al. |
| 6,295,028 B1 | 9/2001 | Jonsson et al. |
| 6,307,511 B1 | 10/2001 | Ying et al. |
| 6,307,519 B1 | 10/2001 | Livingston et al. |
| 6,329,951 B1 | 12/2001 | Wen et al. |
| 6,329,954 B1 | 12/2001 | Fuchs et al. |
| 6,367,939 B1 | 4/2002 | Carter et al. |
| 6,407,710 B2 | 6/2002 | Keilen et al. |
| 6,417,810 B1 | 7/2002 | Huels et al. |
| 6,431,712 B1 | 8/2002 | Turnbull |
| 6,445,352 B1 | 9/2002 | Cohen |
| 6,452,549 B1 | 9/2002 | Lo |
| 6,452,553 B1 | 9/2002 | Cohen |
| 6,476,766 B1 | 11/2002 | Cohen |
| 6,525,691 B2 | 2/2003 | Varadan et al. |
| 6,552,687 B1 | 4/2003 | Rawnick et al. |
| 6,552,690 B2 | 4/2003 | Veerasamy |
| 6,741,210 B2 | 5/2004 | Brachat et al. |
| 6,795,020 B2 | 9/2004 | Sreenivas et al. |
| 6,819,300 B2 | 11/2004 | Göttl |
| 6,937,191 B2 | 8/2005 | Puente Baliarda |
| 6,943,732 B2 | 9/2005 | Gottl et al. |
| 7,250,918 B2 | 7/2007 | Puente Baliarda |
| 2002/0000940 A1 | 1/2002 | Moren et al. |
| 2002/0000942 A1 | 1/2002 | Duroux |
| 2002/0036594 A1 | 3/2002 | Gyenes |
| 2002/0105468 A1 | 8/2002 | Tessier et al. |
| 2002/0109633 A1 | 8/2002 | Ow et al. |
| 2002/0126054 A1 | 9/2002 | Fuerst et al. |
| 2002/0126055 A1 | 9/2002 | Lindenmeier et al. |
| 2002/0175866 A1 | 11/2002 | Gram |
| 2003/0011529 A1 | 1/2003 | Gottl |
| 2003/0090431 A1 | 5/2003 | Gottl |
| 2003/0137456 A1 | 7/2003 | Sreenivas et al. |
| 2004/0108956 A1 | 6/2004 | Gottl et al. |
| 2005/0146481 A1 | 7/2005 | Baliarda |

FOREIGN PATENT DOCUMENTS

| | | |
|---|---|---|
| EP | 0096847 | 12/1983 |
| EP | 0297813 | 1/1989 |
| EP | 0358090 | 3/1990 |
| EP | 0543645 | 5/1993 |
| EP | 0571124 | 11/1993 |
| EP | 0688040 | 12/1995 |
| EP | 0765001 | 3/1997 |
| EP | 0814536 | 12/1997 |
| EP | 0871238 | 10/1998 |
| EP | 0892459 | 1/1999 |
| EP | 0929121 | 7/1999 |
| EP | 0932219 | 7/1999 |
| EP | 0942488 | 9/1999 |
| EP | 0969375 | 1/2000 |
| EP | 0986130 | 3/2000 |
| EP | 0997974 | 5/2000 |
| EP | 1018777 | 7/2000 |
| EP | 1018779 | 7/2000 |
| EP | 1071161 | 1/2001 |
| EP | 1079462 | 2/2001 |
| EP | 1083624 | 3/2001 |

| | | |
|---|---|---|
| EP | 1094545 | 4/2001 |
| EP | 1096602 | 5/2001 |
| EP | 1148581 | 10/2001 |
| EP | 1198027 | 4/2002 |
| EP | 1237224 | 9/2002 |
| EP | 1267438 | 12/2002 |
| ES | 2112163 | 3/1998 |
| ES | 2142280 | 4/2000 |
| FR | 2543744 | 10/1984 |
| FR | 2704359 | 10/1994 |
| GB | 2215136 | 9/1989 |
| GB | 2330951 | 5/1999 |
| GB | 2355116 | 4/2001 |
| JP | 55147806 | 11/1980 |
| JP | 5007109 | 1/1993 |
| JP | 5129816 | 5/1993 |
| JP | 5267916 | 10/1993 |
| JP | 5347507 | 12/1993 |
| JP | 6204908 | 7/1994 |
| JP | 10209744 | 8/1998 |
| JP | 10209749 | 8/1998 |
| WO | WO-9511530 | 4/1995 |
| WO | WO-9627219 | 9/1996 |
| WO | WO-9629755 | 9/1996 |
| WO | WO-9638881 | 12/1996 |
| WO | WO-9706578 | 2/1997 |
| WO | 97/11507 A1 | 3/1997 |
| WO | 97/35360 A1 | 9/1997 |
| WO | WO-9732355 | 9/1997 |
| WO | WO-9733338 | 9/1997 |
| WO | WO-9747054 | 12/1997 |
| WO | 9801923 | 1/1998 |
| WO | WO-9812771 | 3/1998 |
| WO | WO-9836469 | 8/1998 |
| WO | WO-9903166 | 1/1999 |
| WO | WO-9903167 | 1/1999 |
| WO | WO-9925042 | 5/1999 |
| WO | WO-9927608 | 6/1999 |
| WO | 99/59223 A2 | 11/1999 |
| WO | WO-9956345 | 11/1999 |
| WO | WO-9962139 | 12/1999 |
| WO | WO-0001028 | 1/2000 |
| WO | WO-0003453 | 1/2000 |
| WO | WO-0022695 | 4/2000 |
| WO | WO-0036700 | 6/2000 |
| WO | WO-0049680 | 8/2000 |
| WO | WO-0052784 | 9/2000 |
| WO | WO-0052787 | 9/2000 |
| WO | WO-0055939 | 9/2000 |
| WO | WO-0103238 | 1/2001 |
| WO | WO-0108257 | 2/2001 |
| WO | WO-0113464 | 2/2001 |
| WO | WO-0117064 | 3/2001 |
| WO | WO-0122528 | 3/2001 |
| WO | WO-0124314 | 4/2001 |
| WO | WO-0126182 | 4/2001 |
| WO | WO-0128035 | 4/2001 |
| WO | WO-0131739 | 5/2001 |
| WO | WO-0133665 | 5/2001 |
| WO | WO-0135491 | 5/2001 |
| WO | WO-0137369 | 5/2001 |
| WO | WO-0137370 | 5/2001 |
| WO | WO-0141252 | 6/2001 |
| WO | WO-0148861 | 7/2001 |
| WO | WO-0154225 | 7/2001 |
| WO | WO-0173890 | 10/2001 |
| WO | WO-0178192 | 10/2001 |
| WO | WO-0182410 | 11/2001 |
| WO | WO-0235646 | 5/2002 |
| WO | WO-02084790 | 10/2002 |
| WO | WO-02091518 | 11/2002 |
| WO | WO-02096166 | 11/2002 |
| WO | WO-2004055938 | 7/2004 |

OTHER PUBLICATIONS

Hansen, R. C., "Fundamental Limitations in Antennas", Proceedings of the IEEE, vol. 69, No. 2, Feb. 1981, pp. 170-182.
Jaggard, Dwight L., "Fractal Electrodynamics and Modeling", Direction in Electromagnetic Wave Modeling, 1991, pp. 435-446.
Hohlfeld, Robert G. et al., "Self-similarity and the Geometric Requirements for Frequency Independence in Antennas," Fractals, vol. 7, No. 1, 1999, pp. 79-84.
Samavati, Hirad, et al., "Fractal Capacitors", IEEE Journal of Solid-States Circuits, vol. 33, No. 12, Dec. 1998, pp. 2035-2041.
Pribetich, P. et al., "Quasifractal Planar Microstrip Resonators for Microwave Circuits", Microwave and Optical Technology Letters, vol. 21, No. 6, Jun. 20, 1999, pp. 433-436.
Zhang, Dawei et al., Narrowband Lumped-Element Microstrip Filters Using Capacitively-Loaded Inductors', IEEE MTT-S Microwave Symposium Digest, May 16, 1995, pp. 379-382.
Gough, C. E. et al., "High Tc Coplanar Resonators for Microwave Applications and Scientific Studies", Physica C, NL, North-Hollan Publishing, Amsterdam, vol. 282-287, No. 2001, Aug. 1, 1997, pp. 395-398.
Radio Engineering Reference—Book by H. Meinke et al, Radio Components. Circuits with Lumped Parameters. Transmission Lines. Wave-Guides. Resonators. Arrays. Radio Wave Propagation, States Energy Publishing House, Moscow, with English Translation, 1961, 4 pages.
Volgov, V. A, "Parts and Units of Radio Electronic Equipment (Design & Computation)", Energiya, Moscow, with English translation, 1967, 4 pages.
Puente, C. et al., "Multiband Properties of a Fractal Tree Antenna Generated by Electrochemical Deposition", Electronic Letters, IEE, Stevenage, GB, vol. 32, No. 25, Dec. 5, 1996, pp. 2298-2299.
Puente, C. et al., "Small but Long Koch Fractal Monopole", Electronic Letters, IEE Stevenage, GB, vol. 34, No. 1, Jan. 8, 1998, pp. 9-10.
Puente Baliarda, Carles, et al., "The Koch Monopole: A Small Fractal Antenna", IEEE Transactions on Antennas and Propagation, New York, US, vol. 48, No. 11, Nov. 1, 2000, pp. 1773-1781.
Cohen, Nathan "Fractal Antenna Applications in Wireless Telecommunications", Electronics Industries Forum of New England, 1997, Professional Program Proceedings Boston, MA US, May 6-8, 1997, New York, NY US, IEEE, US, May 6, 1997, pp. 43-49.
Anguera, J. et al., "Miniature Wideband Stacked Mircrostrip Patch Antenna Based on the Sierpinski Fractal Geometry", IEEE Antennas and Propagation Society International Symposium 2000 Digest. Aps., vol. 3 of 4, Jul. 16, 1990, pp. 1700-1703.
Hara Prasad, R. V. et al., "Microstrip Fractal Patch Antenna for Multi-Band Communication", Electronics Letters, IEE Stevenage, GB, vol. 36, No. 14, Jul. 6, 2000, pp. 1179-1180.
Borja, C. et al., "High Directivity Fractal Boundary Microstrip Patch Antenna", Electronics Letters, IEE Stevenage, GB, vol. 36, No. 9, Apr. 27, 2000, pp. 778-779.
Ali, M. et al., "A Triple-Band Internal Antenna for Mobile Hand-Held Terminals", IEEE, 1992, pp. 32-35.
Romeu, Jordi et al., "A Three Dimensional Hilbert Antenna", IEEE, 2002, pp. 550-553.
Parker et al., "Microwaves, Antennas and Propagation", IEEE Proceedings H, Feb. 1991, pp. 19-22.
Haupt, Randy L, "Interleaved Thinned Linear Arrays", IEEE Transactions on Antennas and Propagation, vol. 53, No. 9, Sep. 2005, pp. 2858-2864.
Mayes, Paul E., "Frequency-Independent Antennas and Broad-Band Derivatives Thereof", Proceedings of the IEEE, vol. 80, No. 1, Jan. 1992, pp. 103-112.
Jordan, E. C. et al., "Developments in Broadband Antennas", IEEE Spectrum, Apr. 1964, pp. 58-71.
Schelkunoff, S. A., "A Mathematical Theory of Linear Arrays", Bell System Technical Journal, pp. 80-107.
Carrel, Robert L., "Analysis and Design of the Log-Periodic Dipole Antenna", University of Illinois, Antenna Laboratory, Technical Report No. 52, Oct. 1961.
Mandelbrot, Benoit B., "The Fractal Geometry of Nature", W. H. Freeman and Company.
Rumsey, Victor; "Frequency Independent Antennas", Academic Press Inc., Electrical Science Series, 1966.
Chu et al., "Analysis and Design of a Multi-Band Phased Array Using Multi-Feed Dipole Elements", IEEE Antennas and Propagation Society International symposium, Jun. 1995.

Chu et al., "Multiband Phased-Array antenna with Interleaved Tapered-Elements and Waveguide Radiators", Antennas and Propagation Society International Symposium, Jul. 1996.

Decision revoking the European patent EP99953985, European Patent Office, Oral proceedings dated Sep. 9, 2008.

Oral proceedings Sep. 9, 2008—Enclosure 01 (Anlage 01)—Drawings.

Oral proceedings Sep. 9, 2008—Enclosure 02—Eurocell A-Panels GSM 900 / 1800—Dual polarization +45°/−45° polarization 65° half-power beam width, Kathrein, Mar. 1999 (technical datasheet), 8 pages.

Oral proceedings Sep. 9, 2008—Enclosure 03—Eurocell A-Panels GSM 900 / 1800—Dual polarization +45°/−45° polarization 65° half-power beam width, Kathrein, Mar. 1999 (technical datasheet), 6 pages.

Oral proceedings Sep. 9, 2008—Enclosure 04—Eurocell A-Panels GSM 900 / 1800—Dual polarization +45°/−45° polarization 65° half-power beam width, Kathrein, Mar. 1999 (technical datasheet), 6 pages.

Oral proceedings Sep. 9, 2008—Enclosure 05—790-2500 MHz Base station antennas for mobile communications—Catalogue 2006.

Oral proceedings Sep. 9, 2008—Enclosure 08—Arbeitsrichtlinie WB AR102—Erstellen von Tech. Dokumentationen für PA, Kathrein, Apr. 23, 1996.

Oral proceedings Sep. 9, 2008—Enclosure 2.5—new—Invoice from Katrein to Bonanomi, dated on Jul. 29, 1999

Oral proceedings Sep. 9, 2008—Enclosure 3.4—new—Invoice from Katrein to Siemens, dated on Apr. 27, 1999.

Oral proceedings Sep. 9, 2008—Enclosure 3.5—new—Invoice from Katrein to Nokia, dated on Aug. 6, 1999.

Oral proceedings Sep. 9, 2008—Enclosure 4.5—new—Invoice from Katrein to Eircell, dated on Mar. 31, 1999.

Oral proceedings Sep. 9, 2008—Enclosure 16—Letter from Kathrein to the patent attorney Mr. Andrae Flach Haug about confidentiality agreements, dated on Aug. 5, 2008.

Junge, H. D., Lexikon Elektronik, Physik Verlag, Mar. 15, 1978, p. 46-47.

Carver, K.R. et al, "Microstrip antenna technology" in Microstrip antennas—The analysis and design of microstrip antennas and arrays, Pozar; Schaubert, 1985, p. 3-26.

Romeu, J. et al, A three dimensional Hilbert antenna, IEEE Antennas and Propagation Society International Symposium 2002, Jun. 2002.

Meinke, H. et al, Taschenbuch der Hochfrequenztechnik, Springer-Verlag, 1968, p. 496-505.

Navarro, M., Aplicació de diverses modificacions sobre l'antena Sierpinski, antena fractal multibanda, Universitat Politècnica de Catalunya, Nov. 1997.

Desclos, L. et al., "Compact double frequency printed arrays for multi-mode communication applications", Proceedings of the Society Conference of IEICE, vol. 1, 1998.

Rutkowski, Tomasz ; Peixeiro, Custodio. Dual-band onmiderctional microstrip patch array antenna for a mobile communication system. Asia Pacific Microwave Conference, 1997.

Chan, Tungshing, Hwang, Yeongming. A dual-band microstrip array antenna, Antennas and Propagation Society International Symposium, 1995.

Gray, D. et al. Electronically steerable Yagi-Uda microstrip patch antenna array, IEEE Transactions on Antennas and Propagation, vol. 46, No. 5, May 1998.

Gupta, K.C. Broadband techniques for microstrip patch antennas. Symposium of Antenna Application, Sep. 1988.

Jones, H.S. Conformal and small antenna designs, Proceedings of the 1981 Antenna Applications Symposium, Sep. 1981.

Munson, R. et al. Conformal microstrip array for a parabolic dish. Symposium on The USAF Antenna Research and Development Program, Oct. 1973.

Mithani, S. Amendment after allowance of U.S. Appl. No. 10/988,261 dated on May 11, 2007.

Ho, T. Notice of Allowance of U.S. Appl. No. 10/135,019 dated on Aug. 12, 2004.

Ho, T. Notice of Allowance of U.S. Appl. No. 10/135,019 dated on Mar. 14, 2005.

Wimer, M. Notice of Allowance of U.S. Appl. No. 10/988,261 dated on Feb. 23, 2007.

Wimer, M. Notice of Allowance of U.S. Appl. No. 11/803,782 dated on Apr. 23, 2009.

Wimer, M. Notice of Allowance of U.S. Appl. No. 11/803,782 dated on Jan. 15, 2009.

Ho, T. Office Action of U.S. Appl. No. 10/135,019 dated on Mar. 3, 2004.

Ho, T. Office Action of U.S. Appl. No. 10/935,559 dated on Nov. 21, 2005.

Wimer, M. Office Action of U.S. Appl. No. 10/988,261 dated on Aug. 24, 2006.

Wimer, M. Office Action of U.S. Appl. No. 10/988,261 dated on Jan. 26, 2006.

Wimer, M. Office Action of U.S. Appl. No. 10/988,261 dated on May 1, 2007.

Wimer, M. Office Action of U.S. Appl. No. 11/803,782 dated on May 29, 2008.

Robinson, R. Response to Office Action dated Aug. 24, 2006 of U.S. Appl. No. 10/988,261.

Robinson, R. Response to Office Action dated Jan. 26, 2006 of U.S. Appl. No. 10/988,261.

Sauer, J. Response to Office Action dated Mar. 3, 2004 of U.S. Appl. No. 10/135,019.

Mithani, S. Response to Office Action dated on May 29, 2008 of U.S. Appl. No. 11/803,782.

* cited by examiner

6a

6b

6c

INTERLACED MULTIBAND ANTENNA ARRAYS

This patent application is a continuation of U.S. patent application Ser. No. 11/803,782, filed on May 16, 2007 now U.S. Pat. No. 7,557,768, U.S. patent application Ser. No. 11/803,782 is a continuation of U.S. patent application Ser. No. 10/988,261, filed on Nov. 12, 2004 and now U.S. Pat. No. 7,250,918. U.S. patent application Ser. No. 10/988,261 is a continuation of U.S. patent application Ser. No. 10/135,019, filed on Apr. 23, 2002 and now U.S. Pat. No. 6,937,191. U.S. patent application Ser. No. 10/135,019 is a continuation of PCT/ES99/00343, filed on Oct. 26, 1999. U.S. patent application Ser. No. 11/803,782, U.S. Pat. No. 7,250,918, U.S. Pat. No. 6,937,191, and International Application No. PCT/ES99/00343 are incorporated herein by reference.

OBJECT OF THE INVENTION

The present invention consists of antenna arrays which can be operated simultaneously in various frequency bands thanks to the physical disposition of the elements that constitute it, as well as the multiband behaviour of some elements situated strategically in the array.

The array configuration is described on a basis of the juxtaposition or interleaving of various conventional single-band arrays operating in the different bands of interest. In those positions where elements of different multiband arrays come together, use is made of a multiband antenna which covers the different working frequency bands.

The use of a multiband interleaved antenna array (hereinafter simply Multiband Interleaved Array, MIA) implies a great advantage over the classical solution of employing an array for each frequency band: there is a cost saving in the overall radiating system and in its installation (one array replaces several), its size is reduced as well as its visual and environmental impact in the case of base and repeater stations for communication systems.

The present invention finds its application in the field of telecommunications and more specifically in radiocommunication systems.

BACKGROUND AND SUMMARY OF THE INVENTION

Antennas started to be developed at the end of the nineteenth century based on the fundamental laws of electromagnetism postulated by James Clerk Maxwell in 1864. The invention of the first antenna has to be attributed to Heinrich Hertz in 1886 who demonstrated the transmission through air of electromagnetic waves. In the mid-1940s the fundamental restrictions regarding the reduction in size of antennas were shown with respect to wavelength and at the beginning of the sixties appeared the first frequency-independent antennas (E. C. Jordan, G. A. Deschamps, J. D. Dyson, P. E. Mayes, "Developments in Broadband Antennas," IEEE Spectrum, vol. 1, pp. 58-71, April 1964; V. H. Rumsey, *Frequency-Independent Antennas*. New York Academic, 1966; R. L. Carrel, "Analysis and design of the log-periodic dipole array," Tech. Rep. 52, Univ. of Illinois Antenna Lab., Contract AF33 (616)-6079, October 1961; P. E. Mayes, "Frequency Independent Antennas and Broad-Band Derivatives Thereof", Proc. IEEE, vol. 80, no. 1, January 1992). At that time proposals were made for helical, spiral, log-periodic arrays, cones and structures defined exclusively by angle pieces for the implementation of broadband antennas.

Antenna array theory goes back to the works of Shelkunoff (S. A. Schellkunhoff, "A Mathematical Theory of Linear Arrays," Bell System Technical Journal, 22,80), among other classic treatises on antenna theory. Said theory establishes the basic design rules for shaping the radiation properties of the array (principally its radiation pattern), though its application is restricted mainly to the case of mono-band arrays. The cause of said restriction lies in the frequency behaviour of the array being highly dependent on the ratio between the distance between elements (antennas) of the array and the working wavelength. Said spacing between elements is usually constant and preferably less than one wavelength in order to prevent the appearance of diffraction lobes. This implies that once the spacing between elements is fixed, the operating frequency (and the corresponding wavelength) is also fixed, it being particularly difficult that the same array work simultaneously at another higher frequency, given that in that case the magnitude of the wavelength is less than the spacing between elements.

The log-periodic arrays suppose one of the first examples of antenna arrays capable of covering a broad range of frequencies (V. H. Rumsey, *Frequency-Independent Antennas*. New York Academic, 1966; R. L. Carrel, "Analysis and design of the log-periodic dipole array," Tech. Rep. 52, Univ. Illinois Antenna Lab., Contract AF33 (616)-6079, October 1961; P. E. Mayes, "Frequency Independent Antennas and Broad-Band Derivatives Thereof", Proc. IEEE, vol. 80, no. 1, January 1992). Said arrays are based on distributing the elements that constitute it in such a manner that the spacing between adjacent elements and their length vary according to a geometric progression. Although said antennas are capable of maintaining a same radiation and impedance pattern over a broad range of frequencies, their application in practice is restricted to some concrete cases due to their limitations regarding gain and size. Thus for example, said antennas are not employed in cellular telephony base stations because they do not have sufficient gain (their gain is around 10 dBi when the usual requirement is for about 17 dBi for such application), they usually have linear polarisation whilst in said environment antennas are required with polarisation diversity, their pattern in the horizontal plane does not have the width necessary and their mechanical structure is too bulky.

The technology of individual multiband antennas is markedly more developed. A multiband antenna is understood to be an antenna formed by a set of elements coupled to each other electromagnetically which interact with each other in order to establish the radio-electric behaviour of the antenna, behaviour which with respect to radiation and impedance patterns is similar in multiple frequency bands (hence the name multiband antenna). Numerous examples of multiband antennas are described in the literature. In 1995 antennas of the fractal or multifractal type were introduced (the coining of the terms fractal and multifractal is attributable to B. B. Mandelbrot in his book *The Fractal Geometry of Nature*, W.H. Freeman and Co 1983), antennas which by their geometry have a multifrequency behaviour and, in determined cases, a reduced size (C. Puente, R. Pous, J. Romeu, X. Garcia "Antenas Fractales o Mulitfractales", (Spanish patent P9501019). Subsequently multi-triangular antennas were introduced (Spanish patent P9800954) which could work simultaneously in the GSM 900 and GSM 1800 bands and, more recently, multilevel antennas (Patent PCT/ES99/00296), which offer a clear example of how it is possible to shape the geometry of the antenna in order to achieve a multiband behaviour.

The present invention describes how multiband antennas can be combined in order to obtain an array that works simultaneously in several frequency bands.

A Multiband Interleaved Array (MIA) consists of an array of antennas which has the particularity of being capable of working simultaneously in various frequency bands. This is achieved by means of using multiband antennas in strategic positions of the array. The disposition of the elements that constitute the MIA is obtained from the juxtaposition of conventional mono-band arrays, employing as many mono-band arrays as frequency bands that it is wished to incorporate in the Multiband Interleaved Array. In those positions in which one or various elements originating in the conventional mono-band arrays coincide, a single multiband antenna (element) shall be employed which covers simultaneously the different bands. In the remaining non-concurrent positions, it can be chosen to employ also the same multiband antenna or else recur to a conventional mono-band antenna which works at the pertinent frequency. The excitation at one or various frequencies of each element of the array depends therefore on the position of the element in the array and is controlled by means of the signal distribution network.

BRIEF DESCRIPTION OF THE DRAWINGS

The characteristics expounded in the foregoing, are presented in graphical form making use of the figures in the drawings attached, in which is shown by way of a purely illustrative and not restrictive example, a preferred form of embodiment. In said drawings.

DESCRIPTION OF THE PREFERRED EMBODIMENT OF THE INVENTION

Figure 1:
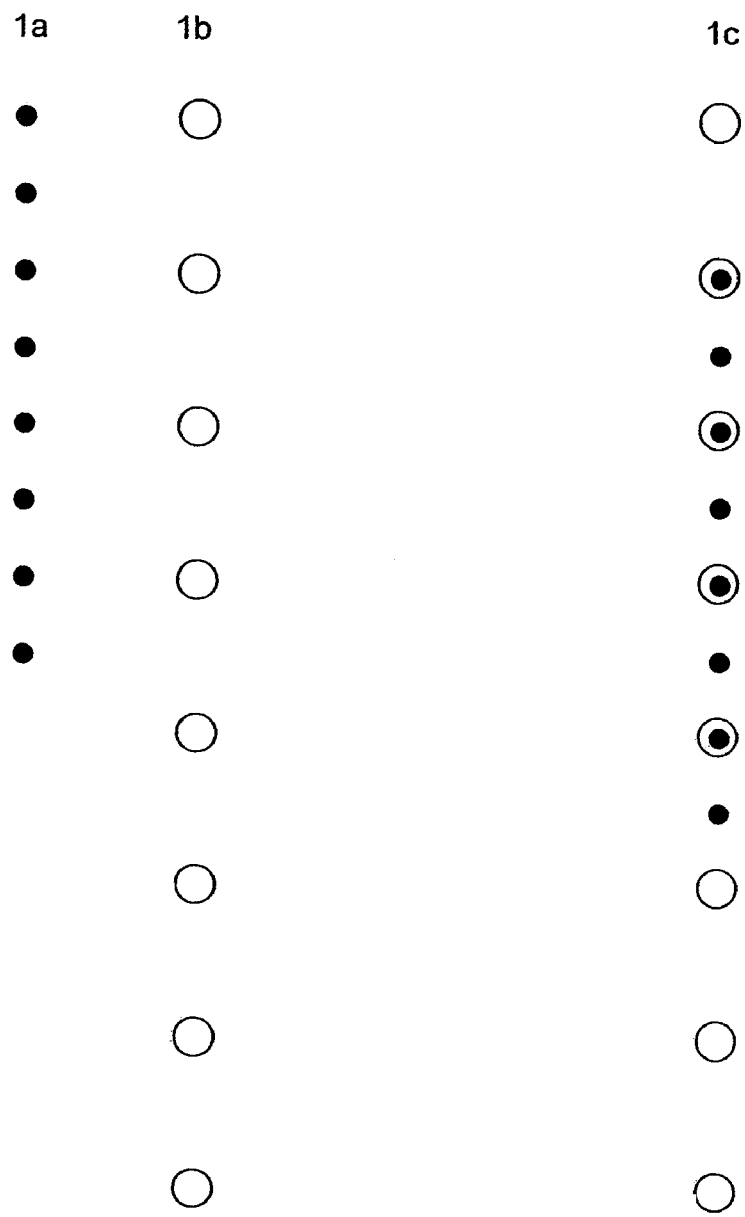
FIG. 1 shows the position of the elements of two classic mono-band arrays which work at frequencies f and f/2 respectively, and the disposition of elements in a multiband interleaved array, which has a dual frequency behaviour (at frequencies f and f/2), working in the same manner as classic arrays but with a smaller total number of elements.

In making the detailed description that follows of the preferred embodiment of the present invention, reference shall constantly be made to the Figures of the drawings, throughout which use has been made of the same numerical references for the same or similar parts.

A multiband interleaved array (MIA) is constituted by the juxtaposition of various conventional mono-band arrays. The conventional antenna arrays usually have a mono-band behaviour (that is, they work within a relatively small frequency range, typically of the order of 10% about a centre frequency) and this is not only because the elements (antennas) that constitute it have a mono-band behaviour, but also because the physical spacing between elements conditions the working wavelength. Typically, the conventional mono-band arrays are designed with a spacing between elements of around a half-wavelength, spacing which may be increased in some configurations in order to enhance directivity, though it is usually kept below one wavelength to avoid the appearance of diffraction lobes.

This purely geometric restriction (the magnitude of the wavelength conditions the geometry of the elements of the array and their relative spacing) signifies a major drawback in those environments and communication systems in which various frequency bands have to be employed simultaneously. A clear example is the GSM cellular mobile telephony system. Initially located in the 900 MHz band, the GSM system has turned into one of the most widespread on a world scale. The success of the system and the spectacular growth in demand for this type of service has led to the cellular mobile telephony operators expanding its service into a new band, the 1800 MHz band, in order to provide coverage for a greater customer base. Making use of classic mono-band antenna technology, the operators have to duplicate their antenna network in order to provide coverage simultaneously to GSM 900 and GSM 1800. Using a single MIA specially designed for the system (like that described in the particular cases of FIGS. 7 through 12), the operators reduce the cost of their network of base stations, the time to expand into the new band and the visual and environmental impact of their installations (through the simplification of the overall radiating structure).

It is important to point out that the scenario which has just been outlined above deals only with one particular example of a type of MIA and its application; as may well be gauged by anyone familiar with the subject, in no way are the MIAs which are described in the present invention restricted to said specific configuration and can easily be adapted to other frequencies and applications.

The multiband interleaved arrays base their operation on the physical disposition of the antennas which constitute them and on the particular type of element that is employed in some strategic positions of the array.

The positions of the elements in an MIA are determined from the positions of the elements in as many mono-band arrays as there are frequencies or frequency bands required. The design of the array is, in that sense, equal to that of the mono-band arrays insomuch as it is possible to choose the current weighting for each element, in order to shape the radiation pattern according to the needs of each application. The configuration of the MIA is obtained from the juxtaposition of the positions of the different mono-band arrays. Naturally, such juxtaposition proves difficult to implement in practice in those positions in which various antennas of the different arrays coincide; the solution proposed in this invention rests in the use of a multiband antenna (for example of the fractal, multi-triangular, multi-level, etc. type) which covers all the frequencies associated with its position.

A basic and particular example of how to arrange the elements in an MIA is described in FIG. 1. In the columns of the FIGS. (1.1) and (1.2) two conventional mono-band arrays are shown in which the positions of the elements (indicated by the black circles and the circumferences respectively) are chosen in such a manner that the spacing between elements is typically less than the working wavelength. Thus, taking as reference the working frequency f of the array (1.1), the array (1.2) would work at a frequency f/2 as the elements have a spacing double that of the previous case. In FIG. (1.3) the disposition is shown of the elements in the MIA which is capable of working simultaneously on the frequencies f and f/2 conserving basically the same facilities as the two arrays (1.1) and (1.2). In the positions in which elements of the two conventional arrays (indicated in FIG. (1.3) by means of black circles located at the centre of a circumference) coincide, a multiband antenna is employed capable of working in the same manner (same impedance and pattern) on the frequencies (1.1) and (1.2). The remaining not common elements (indicated either by a black circle, or by a circumference) can be implemented either by means of the same multiband element employed in the common positions (and selecting the working frequency by means of the signal distribution network of the array), or by employing conventional mono-band elements. In this example the array (1.3) has a dual behaviour frequency-wise (at frequencies f and f/2), working in the same manner as the arrays (1.1) and (1.2) but with a smaller total number of elements (12 instead of 16).

Multiple examples of multiband antennas are already described in the state of the art. Antennas with fractal geometry, multi-triangular antennas, multi-level antennas even stacked patch antennas are some examples of antennas capable of working in like manner in multiple frequency bands. These, and other multiband elements can be employed in the positions of the MIAs in which elements of various mono-band arrays come together.

Figure 2:
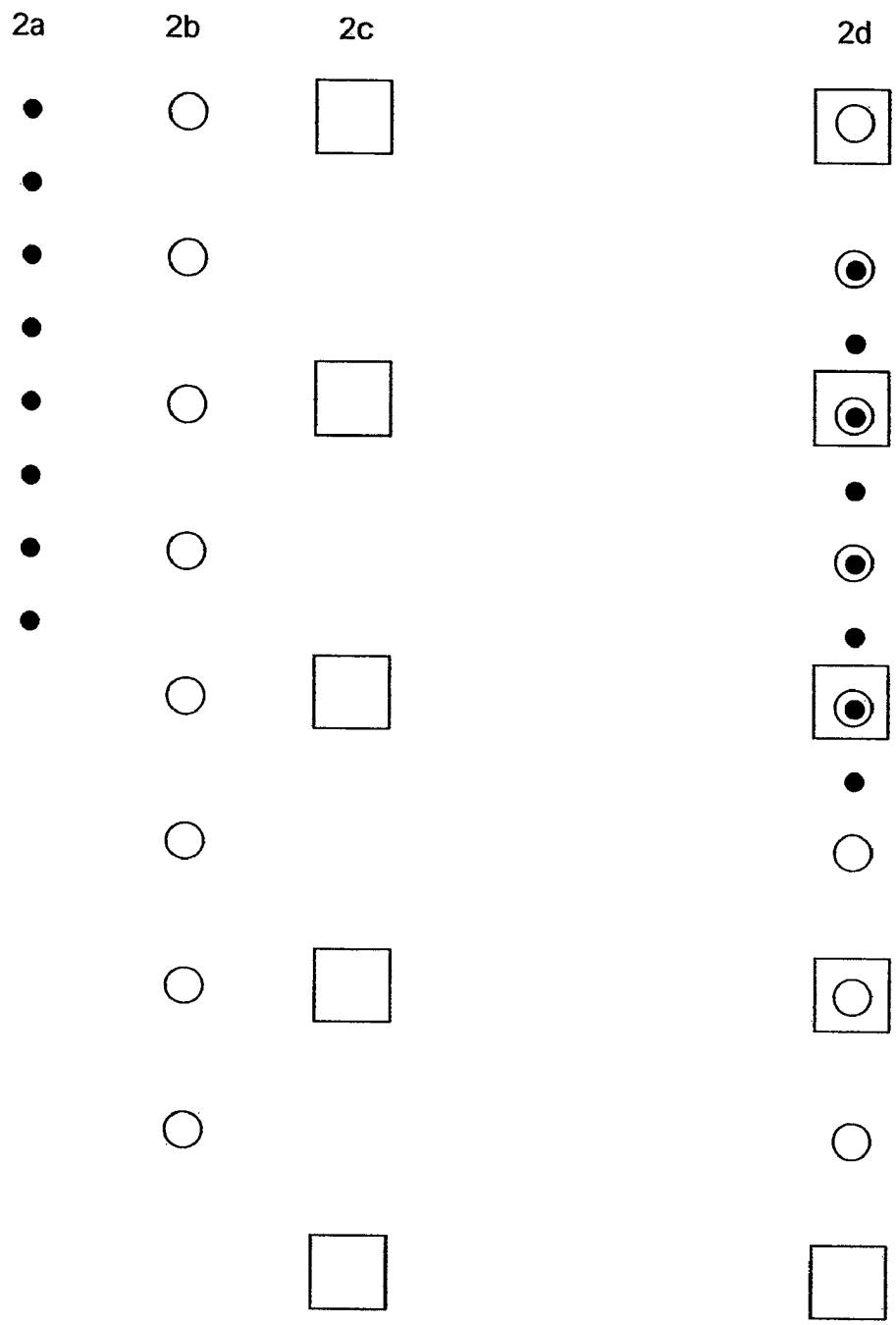
FIG. 2 shows another particular example of multiband interleaved array but with three frequencies in this case, and the respective three classic mono-band arrays which constitute it. It is a matter of extending the case of FIG. 1 to 3 frequencies f, f/2 and f/4.

In the following figures other MIA configurations are shown, based on the same inventive concept, though having the disposition of the elements adapted to other frequencies. In FIG. 2 the configuration described is that of a tri-band MIA working at frequencies f, f/2 and f/4. The disposition of elements in the three mono-band arrays at the frequencies f, f/2 and f/4 is illustrated in the FIGS. (2.1), (2.2) and (2.3) by means of black circles, circumferences and squares respectively. The position of the elements of the MIA is determined from the configuration of the three mono-band arrays designed for each one of the three frequencies. The three arrays come together in the MIA that is shown in FIG. (2.4) In those positions where elements of the three arrays would come together (indicated in the drawing by the juxtaposition of the different geometric figures identifying each array) use is made of a multiband element. The three-frequency array of FIG. (2.4) behaves in the same manner as the three arrays (2.1), (2.2) and (2.3) at their respective working frequencies, but employing only 13 elements instead of the 21 required in the total of the three mono-band arrays.

Figure 3:
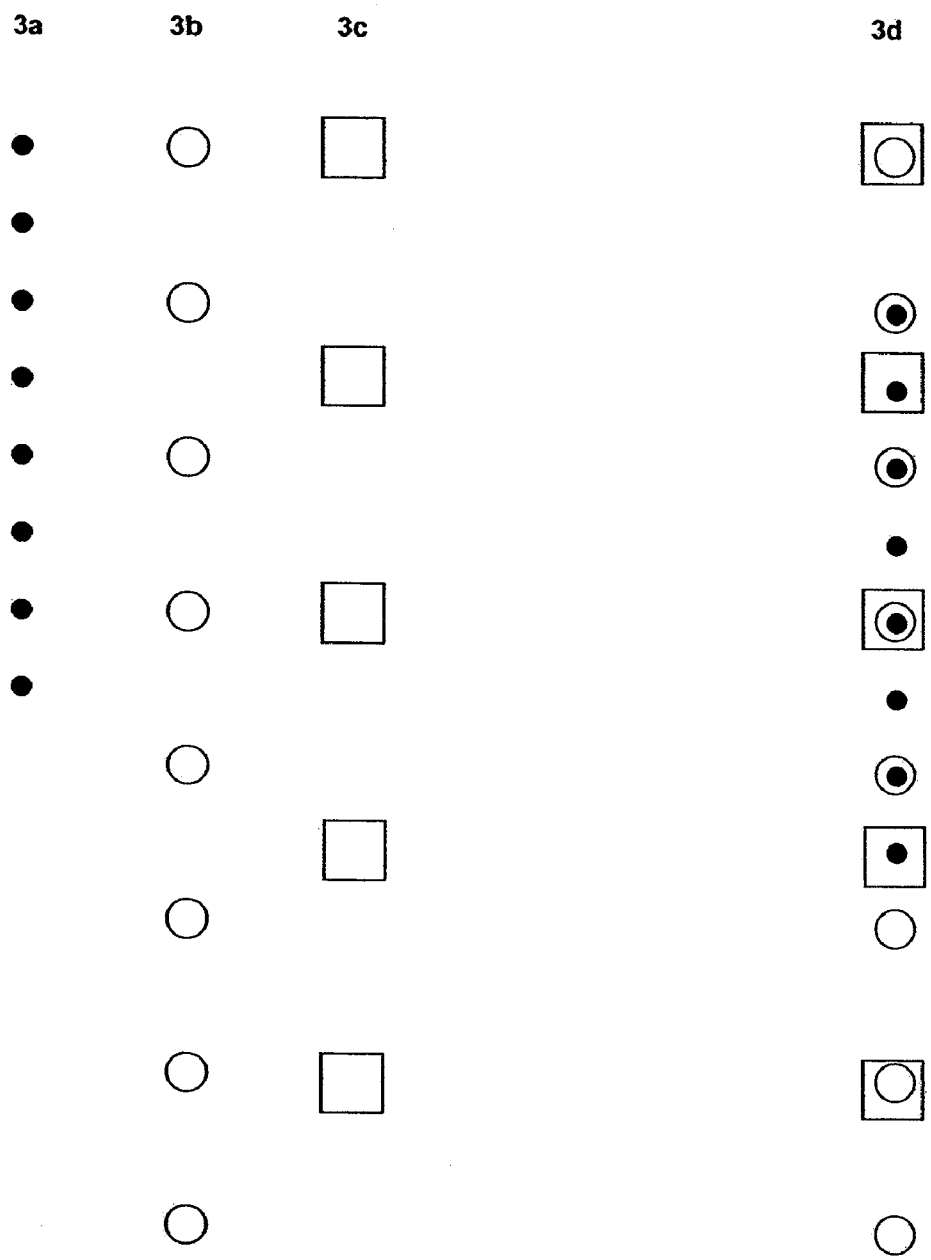
FIG. 3 shows another particular example of multiband interleaved array, in which the different working frequencies are not separated by the same scale. factor. It is a matter of extending the case of FIGS. 1 and 2 to 3 frequencies f, f/2 and f/3.
Figure 4:
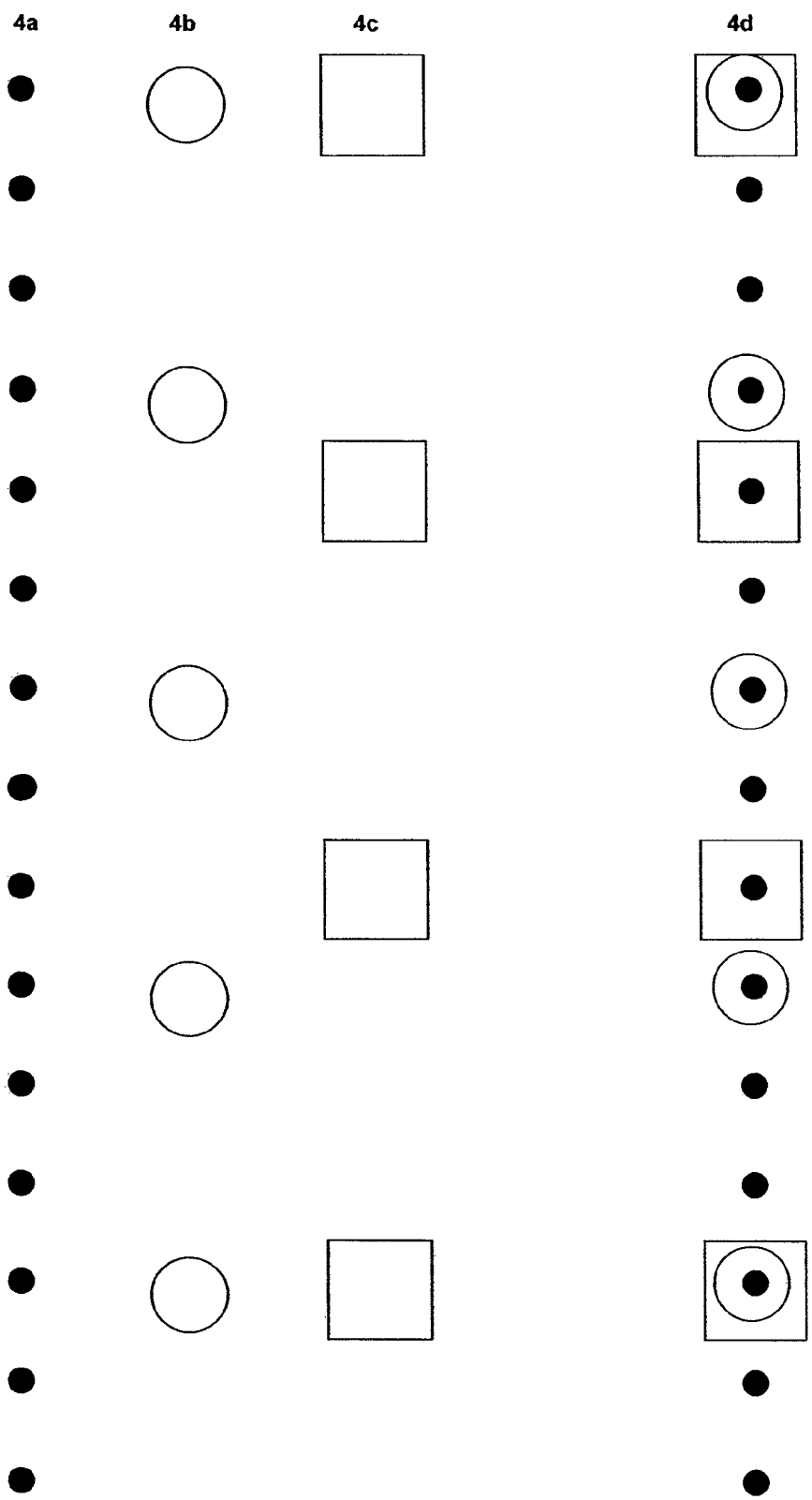
FIG. 4 shows a further particular example of multiband interleaved array, in which the different working frequencies are not separated by the same scale factor. It is a matter of extending the case of FIG. 3 to 3 frequencies f, f/3 and f/4.
Figure 5:
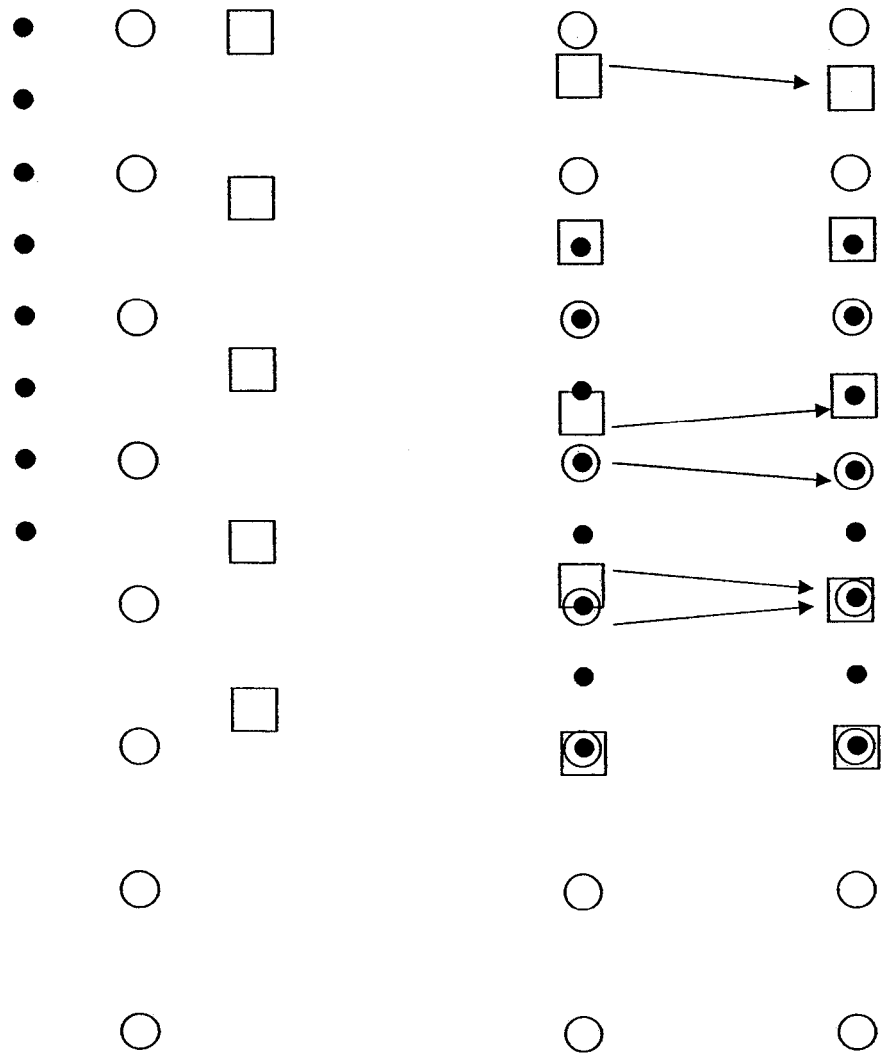
FIG. 5 shows a multiband interleaved array configuration which requires a repositioning of the elements to obtain frequencies that do not correspond to an integer factor of the highest frequency. In this particular example the frequencies f, f/2 and f/2,33 have been chosen.

FIGS. 3, 4 and 5 describe, by way of example and not restrictively, the design of other MIAs based on the same principle though at other frequencies. In the first two cases the frequencies employed are integer multiples of a fundamental frequency; in the case of FIG. 5 the ratio between frequencies is not restricted to any particular rule, though it supposes an example of array in which the frequencies the GSM 900, GSM 1800 and UMTS services can be combined.

Specifically, FIG. 3 illustrates another particular example of multiband interleaved array, in which the different working frequencies are not separated by the same scale factor. It concerns the extension of the case of FIGS. 1 and 2 to 3 frequencies f, f/2 and f/3. The disposition of elements of the three classic mono-band arrays at the frequencies f, f/2 and f/3 is shown in FIGS. (3.1), (3.2) and (3.3) by means of black circles, circumferences and squares respectively. The column of FIG. (3.4) shows the disposition of elements in the tri-band interleaved array. In those positions in which elements of the three arrays come together (indicated in the drawing by the juxtaposition of the different geometric figures identifying each array), use is made of a multiband element; the same strategy is followed in those positions in which elements of two arrays coincide: use should be made of a multiband element capable of covering the frequencies pertinent to its position, preferentially the same element as that used in the remaining positions, selecting those frequencies which are necessary by means of the feeder network. Notice that as the three-frequency array of FIG. (3.4) behaves in the same manner as the three arrays (3.1), (3.2) and (3.3) at their respective working frequencies, but employing only 12 elements instead of the 21 required in the total of the three mono-band arrays.

FIG. 4 illustrates a new particular example of multiband interleaved array, in which the different working frequencies are not separated by the same scale factor. It concerns the extension of the case of FIG. 3 to 3 frequencies f, f/3 and f/4. The disposition of elements of the three classic mono-band arrays at the frequencies f, f/3 and f/4 are shown in FIGS. (4.1), (4.2) and (4.3) by means of black circles, circumferences and squares respectively. The column of FIG. (4.4) shows the disposition of elements in the tri-band interleaved array. In those positions where elements of the three arrays would come together (indicated in the drawing by the juxtaposition of the different geometric figures identifying each array), use is made of a multiband element. The three-frequency array of FIG. (4.4) behaves in the same manner as the three arrays (4.1), (4.2) and (4.3) at their respective working frequencies, but employing only 15 elements instead of the 24 required in the total of the three mono-band arrays.

It is convenient to re-emphasise that in the particular cases of FIGS. 3 and 4 the arrays can work at 3 frequencies simultaneously. The disposition of elements is such that the three frequencies do not always coincide in all the elements; nonetheless, by employing a tri-band antenna in those positions and selecting the working frequencies for example by means of a conventional frequency-selective network, it is possible to implement the MIA.

In some configurations of multiband interleaved array, especially in those in which the different frequencies do not correspond to an integral factor of the highest frequency 1, it is required that the elements be repositioned, as in FIG. 5. In this particular example the frequencies f, f/2 and f/2,33 have been chosen. The disposition of elements of the three classic mono-band arrays at the frequencies f, f/2 and f/2,33 is represented in FIGS. (5.1), (5.2) and (5.3) by means of black circles, circumferences and squares respectively. The column of FIG. (5.4) shows what would be the disposition of elements in the tri-band interleaved array according to the same plan as in the previous examples. Notice how in this case the ratio of frequencies involves the collocation of elements at intermediate positions which make its practical implementation difficult. The solution to be adopted in this case consists in displacing the position of the element of the array that works at the lowest frequency (indicated by arrows) until it coincides with another element (that nearest) of the highest frequency array; then the two or more coincident elements in the new position are replaced with a multiband element. An example of the final configuration once the elements have been repositioned, is shown in FIG. (5.5). It is important that the element displaced, be preferentially that of the lowest frequency array, in this way the relative displacement in terms of the working wavelength is the least possible and the appearance of secondary or diffraction lobes is reduced to the minimum.

Figure 6:
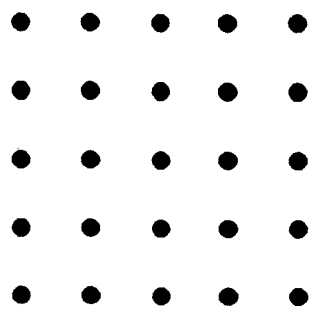
FIG. 6 shows the extension of the design of an MIA to the two-dimensional or three-dimensional case, specifically, ah extension of the example of FIG. 1 to two dimensions.
Figure 6:
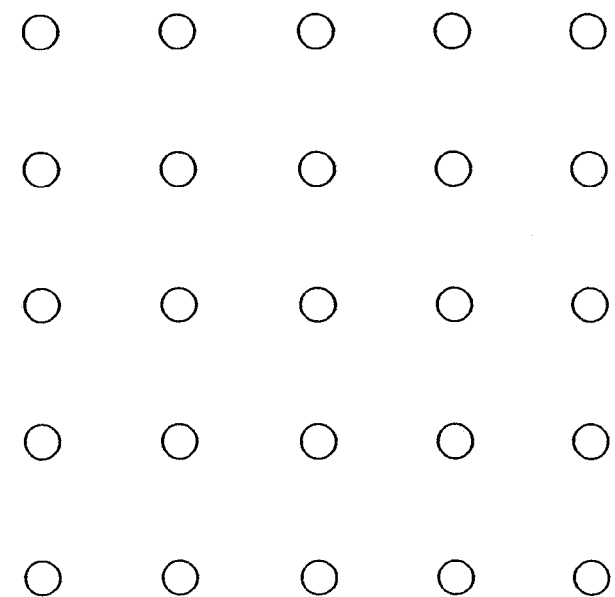
Figure 6:
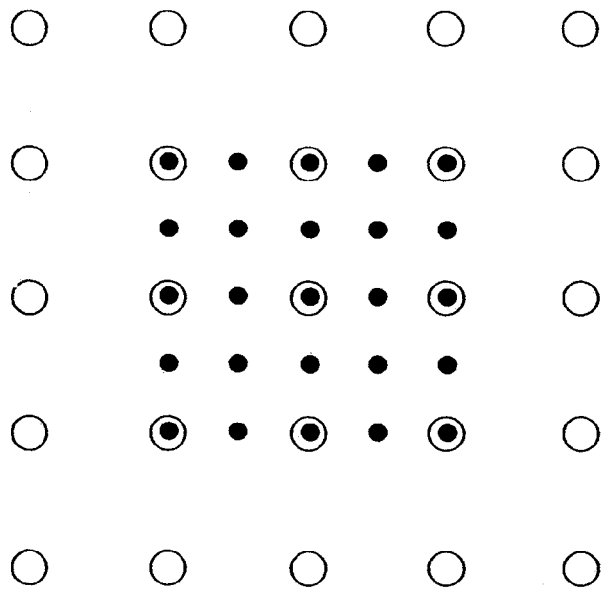

FIG. 6 illustrates how the configuration MIAs is not limited to the linear (one-dimensional) case, but it also includes arrays in 2 and 3 dimensions (2D and 3D). The procedure for distributing the elements of the array in the 2D and 3D cases is the same, replacing also the different coincident elements with a single multiband antenna.

More examples of particular configurations of MIAs are described below. In the five examples described, various designs are presented for GSM 900 and GSM 1800 systems (890 MHz-960 MHz and 1710 MHz-1880 MHz bands). It is a question of antennas for cellular telephony base stations, which present basically the same radiofrequency behaviour in both bands; by employing such versions of MIA antenna the operators reduce the number of antennas installed to one half, minimizing the lost and environmental impact of their base stations.

AEM1 MODE

Figure 7:
FIG. 7 shows one of the preferred of operating modes (AEM1). It is a matter of an MIA in which the multiband elements are multi-triangular elements. The array works simultaneously at dual frequencies, for example in the GSM 900 and GSM 1800 bands.

The AEM1 configuration, represented in FIG. 7, is based on the use of GSM 900 and GSM 1800 multi-triangular elements. The array is obtained by interleaving two conventional mono-band arrays with spacing between elements less than one wavelength ( ) in the pertinent band (typically a spacing is chosen less than 0.9 in order to minimise the appearance of the diffraction lobe in the end-fire direction). The original arrays can have 8 or 10 elements, depending on the gain required by the operator. The juxtaposition of both arrays in a single MIA is achieved in this case by employing dual multi-triangular elements. Such elements incorporate two excitation points (one for each band), which allows the working band to be selected according to their position in the array. In FIG. 7 the position of the elements is shown, as well as their working frequencies. The elements shown in white indicate operation in the GSM 900 band; the elements shown in black indicate operation in the GSM 1800 band and the elements marked in black in the lower triangle and in white in their two upper triangles indicate simultaneous operation in both bands. Precisely the simultaneous operation in both bands via a single multiband element (the multi-triangular element) in such positions of the array (those positions at which those of the original mono-band arrays coincide), is one of the main characteristic features of the MIA invention.

The manner of feeding the elements of the AEM1 array is not characteristic of the invention of the MIAs and recourse may be had to any conventionally known system. In particular and given that the multi-triangular elements are excited at two different points, it is possible to make use of an independent distribution network for each band. Another alternative consists in employing a broadband or dual band distribution network, by coupling a combiner/diplexer which interconnects the network and the two excitation points of the multi-triangular antenna.

Finally, the antenna may therefore come with two input/output connectors (one for each band), or combined in a single connector by means of a -combiner/diplexer network.

AEM2 MODE

Figure 8:
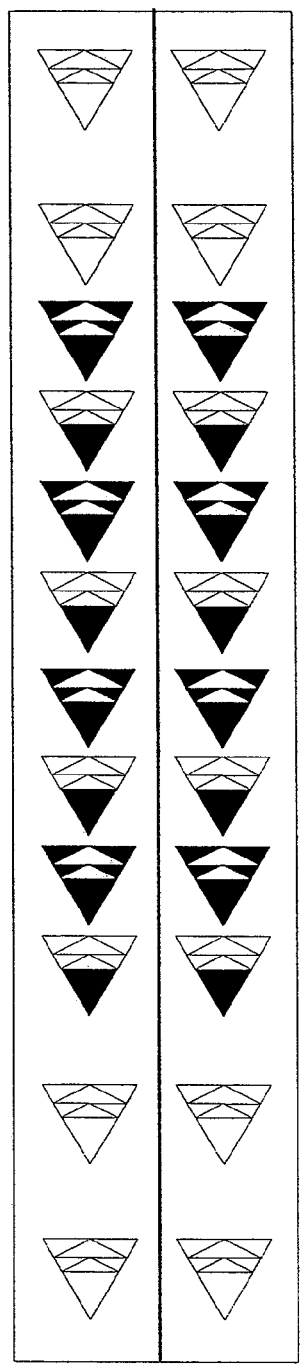
FIG. 8 shows another of the preferred operating modes (AEM2). It is a matter of an MIA in which the multiband elements are multilevel elements. The array works simultaneously at dual frequencies, for example in the GSM 900 and GSM 1800 bands.

This particular configuration of AEM2, shown in FIG. 8, is based on a multilevel antenna which acts as a multiband element. In addition to working simultaneously in the GSM 900 and GSM 1800 bands, the antenna has also double linear polarisation at +45° and −45° with respect to the longitudinal axis of the array. The fact that the antenna has double polarisation signifies an additional advantage for the cellular telephony operator, since in this manner he can implement a diversity system which minimises the effect of fading by multipath propagation. The multilevel element which is described in FIG. 8 is more suitable than the multi-triangular element described previously since the element itself has a linear polarisation at +45° in GSM 900 and at −45° in GSM 1800.

The array is obtained by interleaving two conventional mono-band arrays with spacing between elements less than one wavelength ( ) in the pertinent band (typically a spacing less than 0.9 is chosen in order to minimise the appearance of the diffraction lobe in the end-fire direction). The original arrays can have 8 or 10 elements depending on the gain required by the operator. The juxtaposition of both arrays in a single MIA is achieved in this case by employing in-band dual multilevel elements. Such elements incorporate two points of excitation (one for each band), which permits the working band to be selected according to their position in the array. In FIG. 8 the position of the elements is shown, as well as their working frequencies. The elements shown in white indicate operation in the GSM 900 band; the elements shown in black indicate operation in the GSM 1800 band and the elements marked in black in their lower triangle and in white in the upper triangles indicate simultaneous operation in both bands. Precisely the simultaneous operation in both bands via a single multiband element (the multilevel element) in such positions of the array (those positions in which those of the original mono-band arrays coincide), is one of the main characteristic features of the MIA invention.

It is possible to achieve double polarisation on a basis of exciting the multilevel element at various points on its surface; nonetheless in order to augment the isolation between connectors of different polarisation, it is chosen in the example described to implement a double column to separate the +45° polarization (left-hand column) from that of −45° (right-hand column). To increase the isolation between bands, it is even possible to Interchange the polarisation inclination in the columns of the array in one of the bands (for example in DCS).

The manner of feeding the elements of the array AEM2 is not characteristic of the invention of the MIAs and recourse can be had to any conventionally known system. In particular and given that the multi-triangular elements are excited at two different points, it is possible to make use of an independent distribution network for each band and polarisation. Another alternative consists in employing a broadband or dual band distribution network, by coupling a combiner/diplexer which interconnects the network and the two excitation points of the multilevel antenna. The antenna may then come with four input/output connectors (one for each band and polarisation), or else combined in only two connectors (one for each independent polarisation) by means of combiner/diplexer network in each polarisation.

AEM3 MODE

Figure 9:
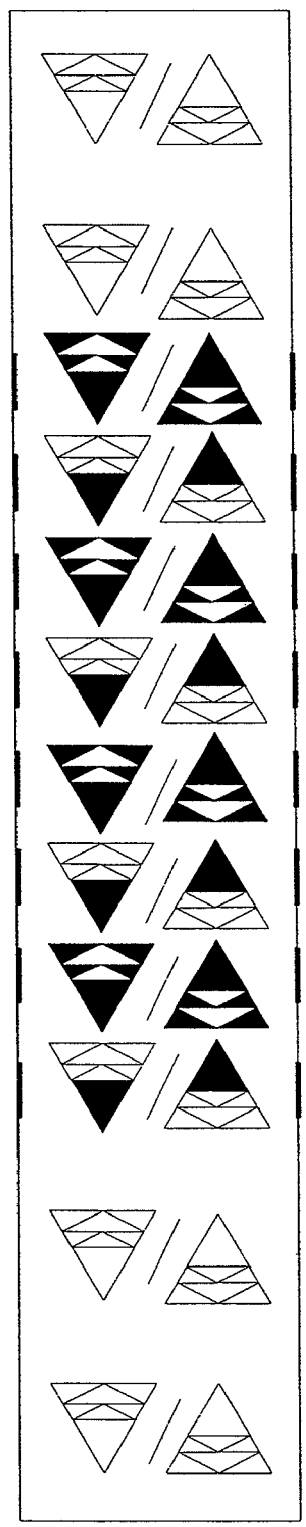
FIG. 9 shows another of the preferred operating modes (AEM3). It is a matter of an MIA in which the multiband elements are multilevel elements. The configuration is similar to that of FIG. 8 (AEM2 mode), the difference being that the new disposition permits the total width of the antenna to be reduced.

The AEM3 configuration, as shown in FIG. 9, is very similar to the AEM2 (the position of the-multilevel elements and the type of element itself is the same as in the previous case), with the difference that the right-hand column is reversed with respect to that on the left. In this manner an antenna with dual band and polarisation is obtained, the total width of the antenna being reduced with respect to the previous case (in this particular example the width is reduced by about 10%). In order to increase the isolation between the columns of double polarisation it is convenient that oblique fins be inserted between contiguous elements. In that case, lateral fins are also incorporated in all the elements which work in GSM 1800, fins which contribute to narrowing the radiation beam in the horizontal plane (plane at right angles to the longitudinal axis of the array).

Nor is the signal distribution system especially characteristic of the MIA configuration and the same system can be used as in the previous case.

AEM4 MODE

Figure 10:
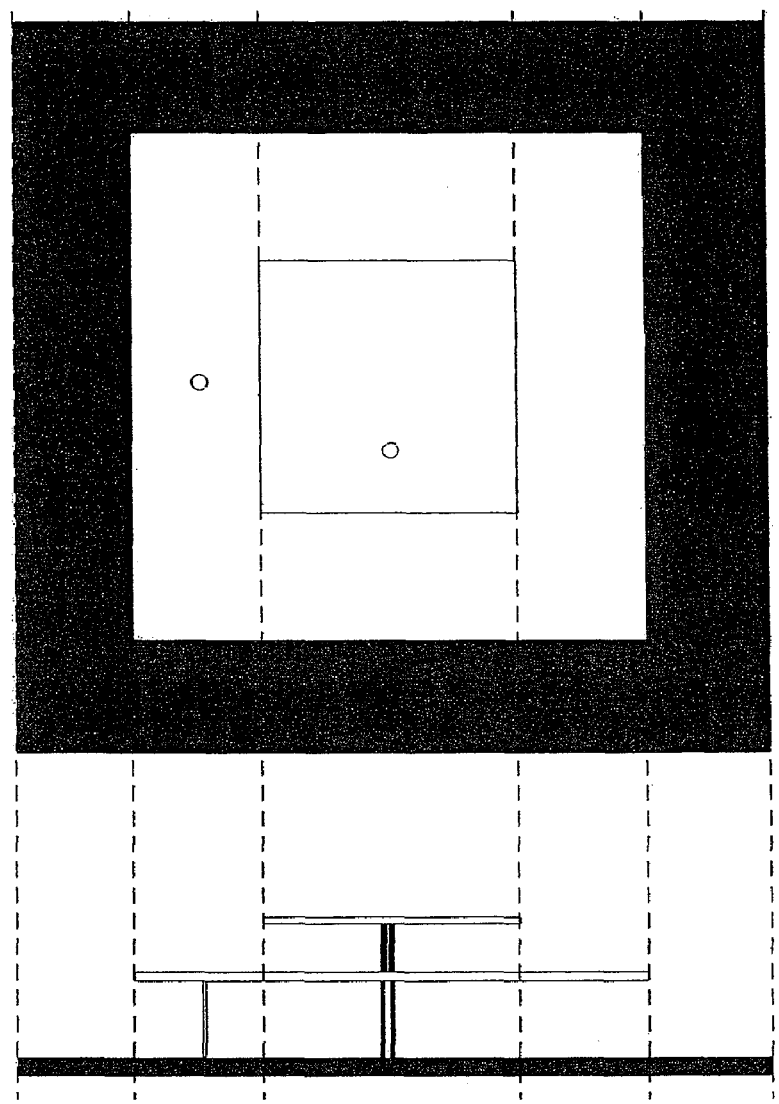
FIG. 10 shows another example of multiband antenna which can be employed in MIAs. It is a matter of a stacked patch antenna, which in this specific example works at two dual frequencies (for example, GSM 900 and GSM 1800).
Figure 11:
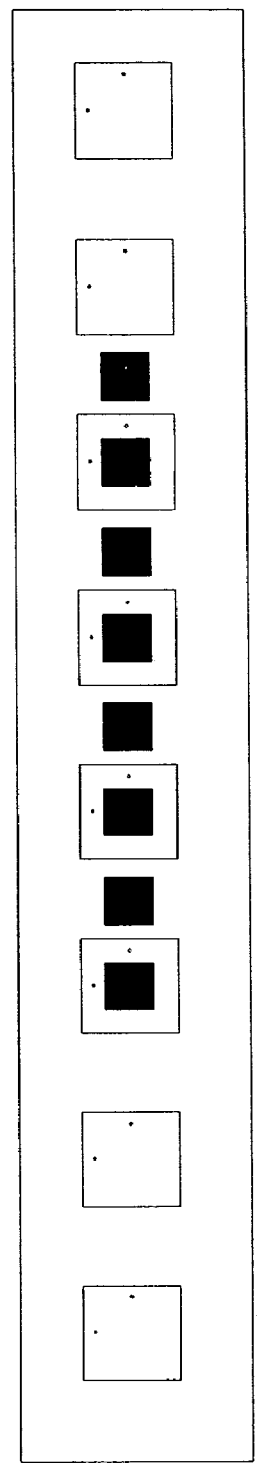
FIG. 11 shows the disposition of said patches in the MIA type array (AEM4 configuration). Observe that, in contrast to the previous cases, in this case multiband antennas are employed only in those positions where it is strictly necessary; in the remainder mono-band elements are employed the radiation pattern of which is sufficiently like that of the multiband element in the pertinent band.

Another example of multiband interleaved array is that termed herein AEM4 and which is shown in schematic form in FIG. 11. In this case, the multiband element is a stacked square patch antenna (FIG. 10), though it is obvious for anyone familiar with the subject that patches of other shapes could be employed. Square- or circular-shaped types are preferred in the event that is wished to work with double polarisation. In the example of FIG. 10 the particular case is described of square patches.

The lower patch is of appropriate size for its resonant frequency (associated typically with the patch fundamental mode) to coincide with the lower band (GSM 900 in this specific case); moreover, this patch acts in turn as ground plane of the upper patch. The latter is of a size such that its resonance is centered in the upper band (GSM 1800). The elements of the array are mounted on a metallic or metal-coated surface which acts as ground plane for all the elements of the array. The feeder system is preferentially of the coaxial type, a cable being employed for the lower patch and band and another for the upper patch and band. The excitation points are collocated on the bisectors of the patches (for example, the approximate excitation points are marked by means of circles on the plan view of the antenna) if vertical or horizontal polarisation is desired, or on the diagonals if, on the other hand, linear polarisation inclined at 45° is desired. In the event it is desired that the array work with double polarisation, each of the patches is excited additionally on the bisector or diagonal opposite (orthogonal) to the first.

The feeding of the elements of the array AEM4 is not characteristic of the invention of the MIAs and recourse can be had to any conventionally known system. In particular and given that the stacked patch antenna is excited at two different points, it is possible to make use of an independent distribution network for each band and polarisation. Another alternative consists in employing a broadband or dual band distribution network, by coupling a combiner/diplexer which interconnects the network and the two excitation points of the multilevel antenna.

The antenna may then come with four input/output connectors (one for each band and polarisation), or else combined in only two connectors (one for each independent polarisation) by means of a combiner/diplexer network in each polarisation.

AEM5 MODE

Figure 12:
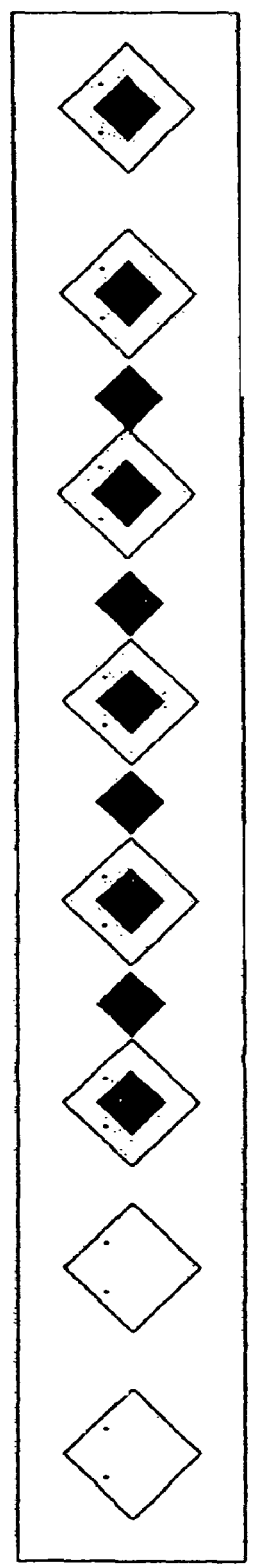
FIG. 12 shows another configuration (AEM5), in Is which the elements have been rotated through 45° in order to facilitate the procurement of double polarisation at +45° or −45°.

The AEM5 configuration, as shown in FIG. 12, adopts the same approach as the AEM4, though all the elements are rotated through 45° in the plane of the antenna. In this manner the radiation pattern is modified in the horizontal plane, in addition to rotating the polarization through 45°.

It is of interest to point out that both in the AEM4 configuration and in the AEM5, the multiband element constituted by the stacked patches is really only strictly necessary in those strategic positions in which elements originating in the conventional mono-band arrays coincide. In the remaining positions, it shall be possible to employ indistinctly multiband or mono-band elements that work at the frequency determined for its location, as long as its radiation pattern is sufficiently like that of the stacked patch antenna in order to avoid the appearance of diffraction lobes.

It is not deemed necessary to extend further the content of this description in order that an expert in the subject can comprehend its scope and the benefits arising from the invention, as well as develop and implement in practice the object thereof.

Notwithstanding, it must be understood that the invention has been described according to a preferred embodiment thereof, for which reason it may be susceptible to modifications without this implying any alteration to its basis, it being possible that such modifications affect, in particular, the form, the size and/or the materials of manufacture.

The invention claimed is:

1. An interlaced multiband antenna array comprising:
  a plurality of antenna elements;
  wherein the interlaced multiband antenna array is adapted to operate simultaneously on a plurality of working frequency bands;
  wherein positions of the plurality of antenna elements result from juxtaposition of a plurality of mono-band antenna arrays, each mono-band antenna array of the plurality of mono-band antenna arrays comprises a plurality of mono-band antenna elements;
  wherein a number of the plurality of mono-band antenna arrays corresponds to a number of the plurality of working frequency bands of the interlaced multiband antenna array;
  wherein the interlaced multiband antenna array employs a single multiband antenna element in positions where mono-band antenna elements of a plurality of the plurality of mono-band antenna arrays come together;
  wherein the single multiband antenna element comprises a plurality of electromagnetically-coupled portions which are adapted to interact with each other to establish radio-electric characteristics of the single multiband antenna element with respect to radiation and impedance patterns that are substantially similar in a plurality of the plurality of working frequency bands;
  wherein a central frequency of a first working frequency band of the plurality of working frequency bands does not corresponds to an integer divider of a central frequency of a second working frequency band of the plurality of working frequency bands; and
  wherein at least one mono-band antenna element of one of the plurality of mono-band antenna arrays operating at said first working frequency band is repositioned to coincide with a nearest mono-band antenna element of another one of the plurality of mono-band antenna arrays operating at said second working frequency band.

2. The interlaced multiband antenna array of claim 1, wherein a single multiband antenna element is also employed in those positions of the interlaced multiband antenna array where mono-band antenna elements of the plurality of mono-band antenna arrays do not come together.

3. The interlaced multiband antenna array of claim 1, wherein two working frequency bands of the plurality of working frequency bands are situated around 1800 MHz and 2100 MHz.

4. The interlaced multiband antenna array of claim 1, wherein at least two mono-band antenna elements of the plurality of mono-band antenna arrays come together in each position of the interlaced multiband antenna array.

5. The interlaced multiband antenna array of claim 1, wherein the interlaced multiband antenna array is adapted to operate simultaneously on at least three frequency bands.

6. The interlaced multiband antenna array of claim 1, wherein two working frequency bands of the plurality of working frequency bands are an operating band of a GSM service and an operating band of a UMTS service.

7. The interlaced multiband antenna array of claim 1, wherein two working frequency bands of the plurality of working frequency bands are situated around 1900 MHz and 2100 MHz.

8. The interlaced multiband antenna array of claim 1, wherein three working frequency bands of the plurality of working frequency bands are situated around 900 MHz, 1800 MHz, and 2100 MHz.

9. The interlaced multiband antenna array of claim 1, wherein two working frequency bands of the plurality of working frequency bands are situated around 800 MHz and 1900 MHz.

10. The interlaced multiband antenna array of claim 2, wherein a broadband signal distribution network is employed to excite the plurality of antenna elements for at least two working frequency bands of the plurality of working frequency bands.

11. An interlaced multiband antenna array comprising:
a plurality of antenna elements;
wherein the interlaced multiband antenna array is adapted to operate simultaneously on a plurality of working frequency bands;
wherein positions of the plurality of antenna elements result from juxtaposition of a plurality of mono-band antenna arrays, each mono-band antenna array of the plurality of mono-band antenna arrays comprises a plurality of mono-band antenna elements;
wherein a number of the plurality of mono-band antenna arrays corresponds to a number of the plurality of working frequency bands of the interlaced multiband antenna array;
wherein the interlaced multiband antenna array employs a single multiband antenna element in positions where mono-band antenna elements of a plurality of the plurality of mono-band antenna arrays come together;
wherein the single multiband antenna element comprises a plurality of electromagnetically-coupled portions which are adapted to interact with each other to establish radio-electric characteristics of the single multiband antenna element with respect to radiation and impedance patterns that are substantially similar in a plurality of the plurality of working frequency bands;
wherein the single multiband antenna operates a first working frequency band and a second working frequency band of the plurality of working frequency bands, a central frequency of said second working frequency band being larger than a central frequency larger of the first working frequency band; and
wherein a ratio between the central frequency of said second working frequency band and the central frequency of said first working frequency band is smaller than 1.5.

12. The interlaced multiband antenna array of claim 11, wherein a first mono-band antenna array of the plurality of mono-band antenna arrays operates said first working frequency band; wherein a second mono-band antenna array of the plurality of mono-band antenna arrays operates said second working frequency band;
wherein a geometrical arrangement of the plurality of mono-band antenna elements of said first mono-band antenna array defines a first length along a first direction;
wherein a geometrical arrangement of the plurality of mono-band antenna elements of said second mono-band antenna array defines a second length along said first direction; and
wherein a ratio between the second length and the first length is not inversely proportional to the ratio between the central frequency of said second working frequency band and the central frequency of said first working frequency band.

13. The interlaced multiband antenna array of claim 11, wherein the first working frequency band is situated around 1800 MHz and wherein the second working frequency band is situated around 2100 MHz.

14. The interlaced multiband antenna array of claim 11, wherein the interlaced multiband antenna array is adapted to operate simultaneously on at least three frequency bands.

15. The interlaced multiband antenna array of claim 11, wherein three working frequency bands of the plurality of working frequency bands are two operating bands of two GSM services and an operating band of a UMTS service.

16. The interlaced multiband antenna array of claim 11, wherein two working frequency bands of the plurality of working frequency bands are situated around 1900 MHz and 2100 MHz.

17. The interlaced multiband antenna array of claim 11, wherein three working frequency bands of the plurality of working frequency bands are situated around 900 MHz, 1800 MHz, and 2100 MHz.

18. The interlaced multiband antenna array of claim 11, wherein three working frequency bands of the plurality of working frequency bands are situated around 1800 MHz, 1900 MHz, and 2100 MHz.

19. The interlaced multiband antenna array of claim 11, wherein a broadband signal distribution network is employed to excite the plurality of antenna elements for at least two working frequency bands of the plurality of working frequency bands.

20. An interlaced multiband antenna array comprising:
a plurality of antenna elements;
wherein the interlaced multiband antenna array is adapted to operate simultaneously on a plurality of working frequency bands;
wherein positions of the plurality of antenna elements result from juxtaposition of a plurality of mono-band antenna arrays, each mono-band antenna array of the plurality of mono-band antenna arrays comprises a plurality of mono-band antenna elements;
wherein a number of the plurality of mono-band antenna arrays corresponds to a number of the plurality of working frequency bands of the interlaced multiband antenna array;

wherein the interlaced multiband antenna array employs a single multiband antenna element in positions where mono-band antenna elements of a plurality of the plurality of mono-band antenna arrays come together;

wherein the single multiband antenna element comprises a plurality of electromagnetically-coupled portions which are adapted to interact with each other to establish radio-electric characteristics of the single multiband antenna element with respect to radiation and impedance patterns that are substantially similar in a plurality of the plurality of working frequency bands; and wherein at least one of the plurality of working frequency bands of the interlaced multiband antenna array is an operating band of a UMTS service.

21. The interlaced multiband antenna array of claim 20, wherein at least one of the plurality of working frequency bands of the interlaced multiband antenna array is an operating band of a GSM service.

22. The interlaced multiband antenna array of claim 20, wherein three working frequency bands of the plurality of working frequency bands are situated around 1800 MHz, 1900 MHz, and 2100 MHz.

23. The interlaced multiband antenna array of claim 20, wherein the interlaced multiband antenna array is adapted to operate simultaneously on at least three frequency bands.

24. The interlaced multiband antenna array of claim 20, wherein two working frequency bands of the plurality of working frequency bands are situated around 900 MHz and 1800 MHz.

25. The interlaced multiband antenna array of claim 20, wherein at least one working frequency band of the plurality of working frequency bands is situated around 1900 MHz.

26. The interlaced multiband antenna array of claim 20, wherein three working frequency bands of the plurality of working frequency bands are two operating bands of two GSM services and an operating band of a UMTS service.

27. The interlaced multiband antenna array of claim 20, wherein two working frequency bands of the plurality of working frequency bands are situated around 800 MHz and 1900 MHz.

28. The interlaced multiband antenna array of claim 20, wherein a broadband signal distribution network is employed to excite the plurality of antenna elements for at least two working frequency bands of the plurality of working frequency bands.

29. An interlaced dual-polarized multiband antenna array comprising:
  a ground plane layer;
  a plurality of dual-polarized antenna elements arranged on the ground plane layer;
  a first multiband distribution network coupled to the plurality of dual-polarized antenna elements; and
  a second multiband distribution network coupled to the plurality of dual-polarized antenna elements;
  wherein the second multiband distribution network is independent from the first multiband distribution network;
  wherein the dual-polarized antenna elements provide a first polarization and a second polarization, the second polarization being substantially orthogonal to the first polarization;
  wherein the interlaced dual-polarized multiband antenna array is adapted to operate simultaneously on a plurality of working frequency bands;
  wherein positions of the plurality of dual-polarized antenna elements result from juxtaposition of a plurality of dual-polarized mono-band antenna arrays, each dual-polarized mono-band antenna array of the plurality of dual-polarized mono-band antenna arrays comprises a plurality of dual-polarized mono-band antenna elements;
  wherein a number of the plurality of dual-polarized mono-band antenna arrays corresponds to a number of the plurality of working frequency bands of the interlaced dual-polarized multiband antenna array;
  wherein the interlaced dual-polarized multiband antenna array employs a single dual-polarized multiband antenna element in positions where dual-polarized mono-band antenna elements of a plurality of the plurality of dual-polarized mono-band antenna arrays come together;
  wherein the single dual-polarized multiband antenna element comprises a plurality of electromagnetically-coupled portions which are adapted to interact with each other to establish radio-electric characteristics of the single dual-polarized multiband antenna element with respect to radiation and impedance patterns that are substantially similar in a plurality of the plurality of working frequency bands;
  wherein the first multiband distribution network provides excitation to the dual-polarized antenna elements in at least two working frequency bands of the plurality of working frequency bands for the first polarization; and
  wherein the second multiband distribution network provides excitation to the dual-polarized antenna elements in said at least two working frequency bands for the second polarization.

30. The interlaced dual-polarized multiband antenna array of claim 29, wherein the first multiband distribution network comprises a first diplexer means; wherein the second multiband distribution network comprises a second diplexer means; and wherein the first diplexer means and the second diplexer means separate excitation signals of each working frequency band of said at least two working frequency bands.

31. The interlaced dual-polarized multiband antenna array of claim 29, further comprising:
  a first single-band distribution network coupled to the plurality of dual-polarized antenna elements; and
  a second single-band distribution network coupled to the plurality of dual-polarized antenna elements;
  wherein the second single-band distribution network is independent from the first single-band distribution network;
  wherein the first single-band distribution network provides excitation to the dual-polarized antenna elements in a working frequency band of the plurality of working frequency bands for the first polarization; and
  wherein the second single-band distribution network provides excitation to the dual-polarized antenna elements in said working frequency band for the second polarization.

32. The interlaced dual-polarized multiband antenna array of claim 31, further comprising:
  a first set of diplexers to interface the first multiband distribution network and the first single-band distribution network with at least some dual-polarized antenna elements of the plurality of dual-polarized antenna elements; and
  a second set of diplexers to interface the second multiband distribution network and the second single-band distribution network with at least some dual-polarized antenna elements of the plurality of dual-polarized antenna elements.

33. The interlaced dual-polarized multiband antenna array of claim 29, wherein the interlaced dual-polarized multiband antenna array is adapted to operate simultaneously on at least three frequency bands.

34. The interlaced dual-polarized multiband antenna array of claim 29, wherein said at least two working frequency bands of the plurality of working frequency bands are an operating band of a GSM service and an operating band of a UMTS service.

35. The interlaced dual-polarized multiband antenna array of claim 29, wherein said at least two working frequency bands of the plurality of working frequency bands are situated around 1900 MHz and 2100 MHz.

36. The interlaced dual-polarized multiband antenna array of claim 29, wherein three working frequency bands of the plurality of working frequency bands are situated around 900 MHz, 1800 MHz, and 2100 MHz.

37. The interlaced dual-polarized multiband antenna array of claim 29, wherein two working frequency bands of the plurality of working frequency bands are situated around 800 MHz and 1900 MHz.

38. The interlaced dual-polarized multiband antenna array of claim 29, wherein the first polarization is a linear polarization at approximately +45 degrees with respect to a longitudinal axis of the interlaced dual-polarized multiband antenna array, and wherein the second polarization is a linear polarization at approximately −45 degrees with respect to said longitudinal axis.

\* \* \* \* \*